(12) United States Patent
Shin

(10) Patent No.: US 8,222,997 B2
(45) Date of Patent: Jul. 17, 2012

(54) METHOD OF PREVENTING COLLISIONS BETWEEN RFID READERS IN RFID SYSTEM

(75) Inventor: Kwang-Yoon Shin, Daejeon (KR)

(73) Assignee: KT&C Co., Ltd., Seoul (KR)

( * ) Notice: Subject to any disclaimer, the term of this patent is extended or adjusted under 35 U.S.C. 154(b) by 1039 days.

(21) Appl. No.: 12/160,710

(22) PCT Filed: Jan. 7, 2007

(86) PCT No.: PCT/KR2007/000093
§ 371 (c)(1),
(2), (4) Date: Jul. 11, 2008

(87) PCT Pub. No.: WO2007/081119
PCT Pub. Date: Jul. 19, 2007

(65) Prior Publication Data
US 2009/0002129 A1  Jan. 1, 2009

(30) Foreign Application Priority Data
Jan. 12, 2006  (KR) .................... 10-2006-00034222

(51) Int. Cl.
| H04Q 5/22 | (2006.01) |
| G08B 13/14 | (2006.01) |
| G06F 7/40 | (2006.01) |
| G06K 7/10 | (2006.01) |
| H04J 3/16 | (2006.01) |

(52) U.S. Cl. .................. 340/10.1; 340/10.4; 340/572.1; 235/426; 235/472.02; 701/51; 701/30.1; 701/66; 370/465

(58) Field of Classification Search .................. None
See application file for complete search history.

(56) References Cited

U.S. PATENT DOCUMENTS

| 5,745,037 A * | 4/1998 | Guthrie et al. ............. 340/573.4 |
| 6,104,333 A * | 8/2000 | Wood, Jr. ...................... 341/173 |
| 6,377,203 B1 | 4/2002 | Doany |
| 7,009,501 B2 * | 3/2006 | Olch ............................. 340/435 |
| 7,023,323 B1 * | 4/2006 | Nysen .......................... 340/10.1 |
| 7,181,017 B1 * | 2/2007 | Nagel et al. ................... 380/282 |
| 7,511,604 B2 * | 3/2009 | Raphaeli et al. ............. 340/10.2 |
| 7,786,866 B2 * | 8/2010 | Berthold .................... 340/572.1 |

(Continued)

FOREIGN PATENT DOCUMENTS

JP  2004-320402 A  11/2004

(Continued)

*Primary Examiner* — Jennifer Mehmood
*Assistant Examiner* — Fekadeselassie Girma
(74) *Attorney, Agent, or Firm* — Farjami & Farjami LLP

(57) ABSTRACT

Disclosed herein is a method of preventing collisions between readers in an RFID system. The method includes a first step of RFID readers selecting transmitting channels by examining channels, a second step of transmitting signals via the selected transmitting channels, a third step of receiving signals via channels having the same frequencies as the selected transmitting channels; a fourth step of determining whether a collision has occurred by examining the status of the signals that are received via the transmitting channels; a fifth step of, if, as a result of the determination at the fourth step, it is determined that a collision between the readers has occurred, repeating the first to fourth steps after delays of random time periods based on a predetermined equation, and a sixth step of, if, as a result of the fourth step, no collision between readers is detected, communicating with the corresponding RFID tags.

3 Claims, 4 Drawing Sheets

U.S. PATENT DOCUMENTS

| | | | |
|---|---|---|---|
| 7,813,822 B1* | 10/2010 | Hoffberg | 700/94 |
| 2004/0179547 A1* | 9/2004 | Kuffner et al. | 370/465 |
| 2005/0157747 A1* | 7/2005 | Yang et al. | 370/465 |
| 2006/0022815 A1* | 2/2006 | Fischer et al. | 340/505 |
| 2007/0109099 A1* | 5/2007 | Raphaeli et al. | 340/10.2 |

FOREIGN PATENT DOCUMENTS

| | | |
|---|---|---|
| KR | 10-2004-0041756 A | 5/2004 |

\* cited by examiner

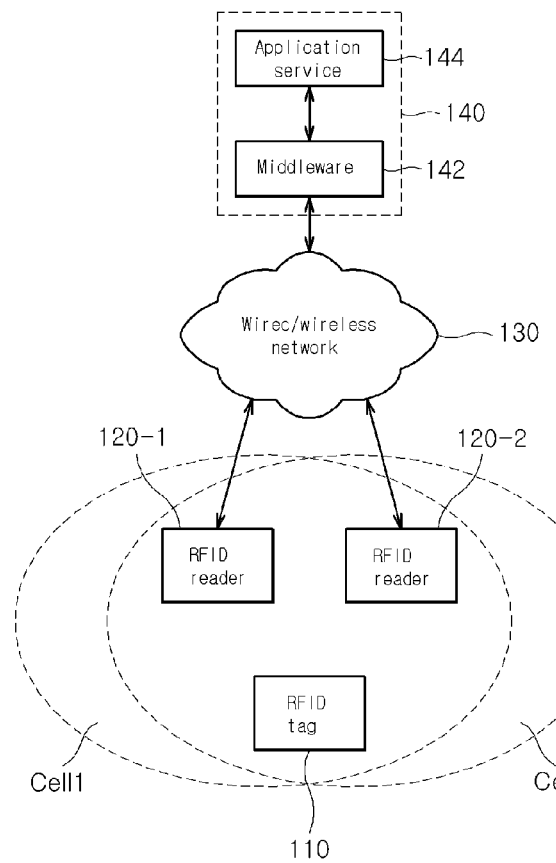
[Fig. 1]
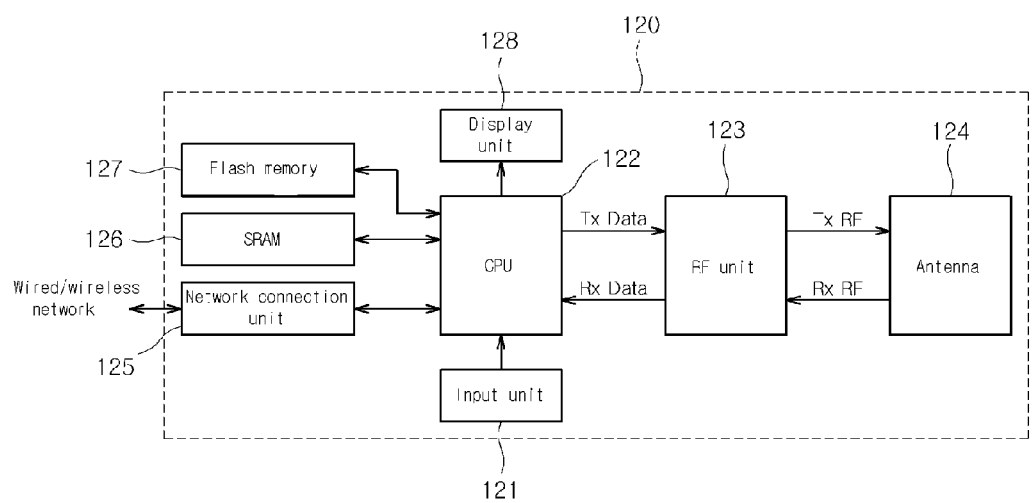
[Fig. 2]

[Fig. 3]
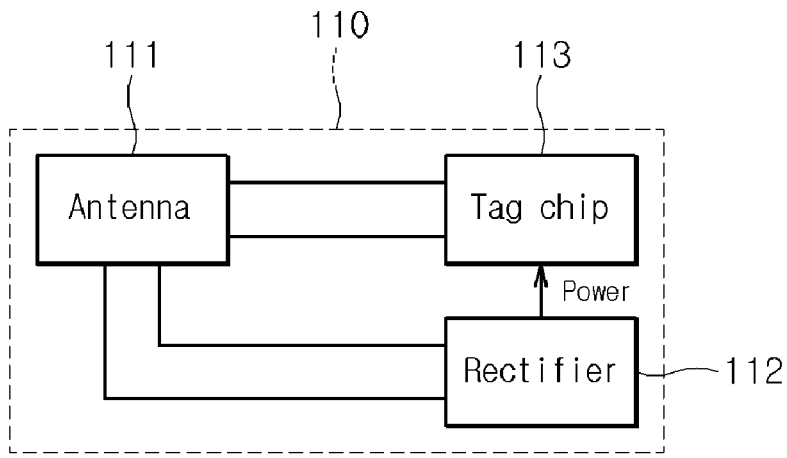
[Fig. 4]
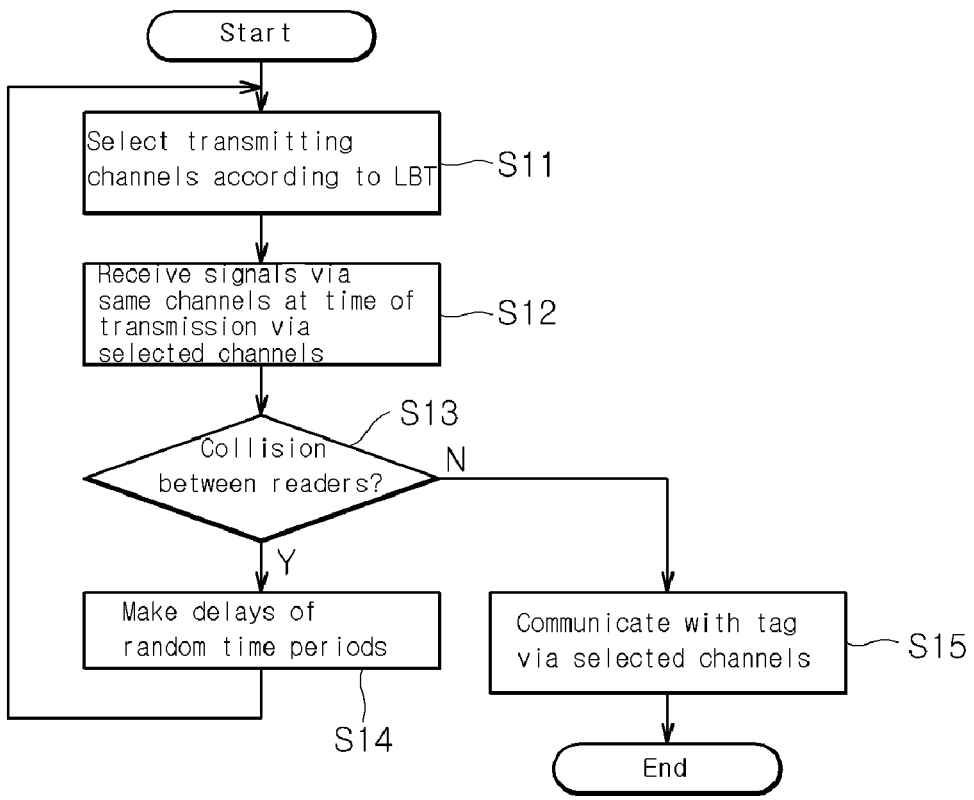

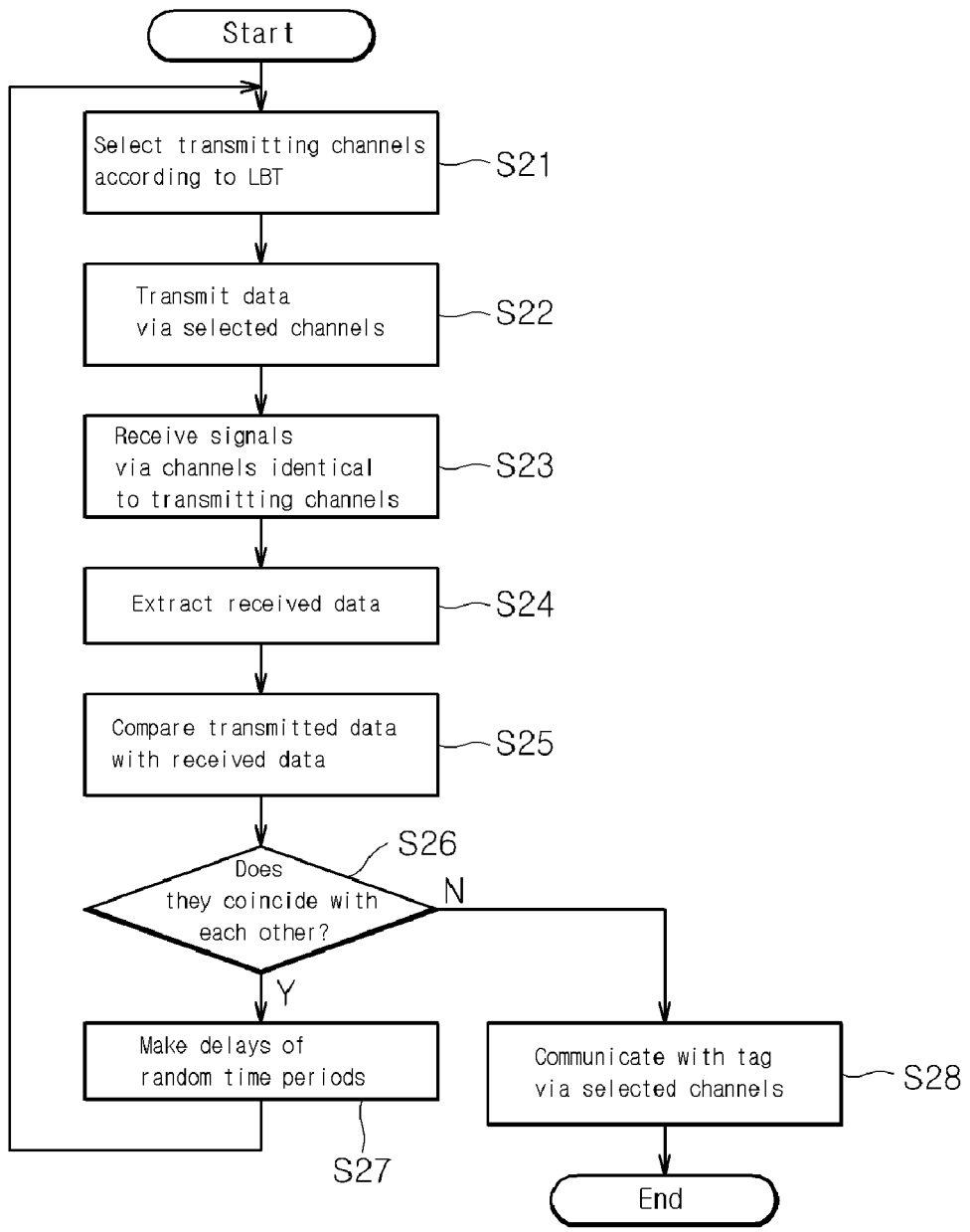
[Fig. 5]

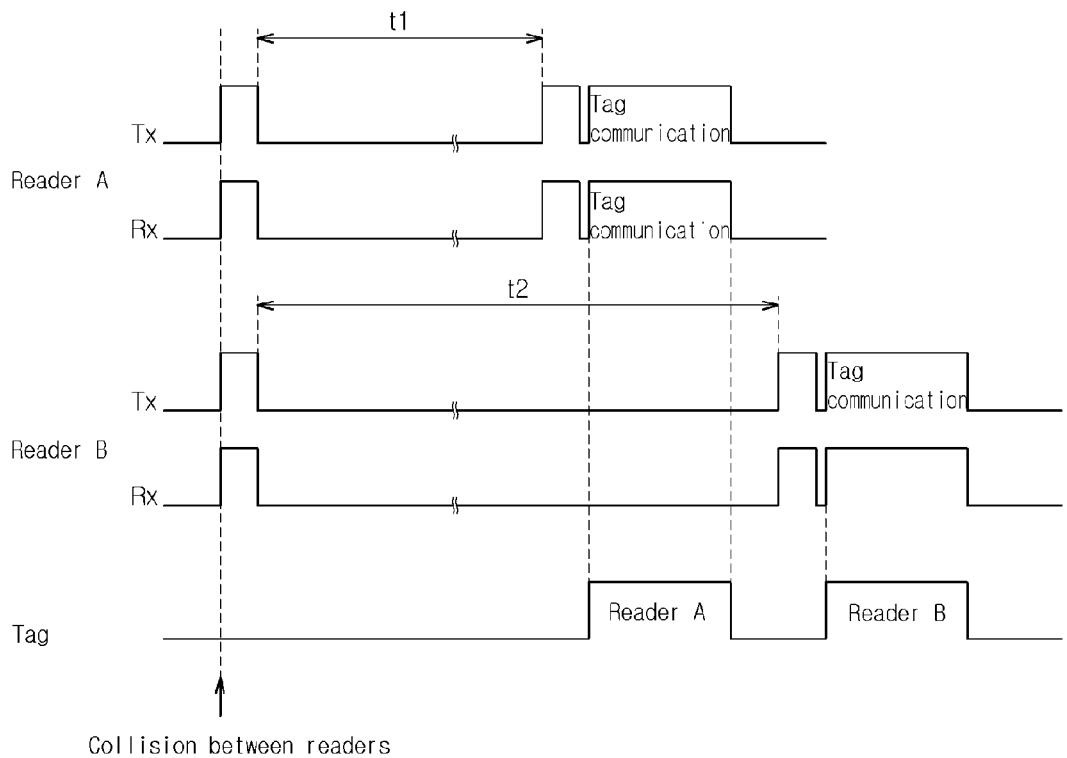
[Fig. 6]
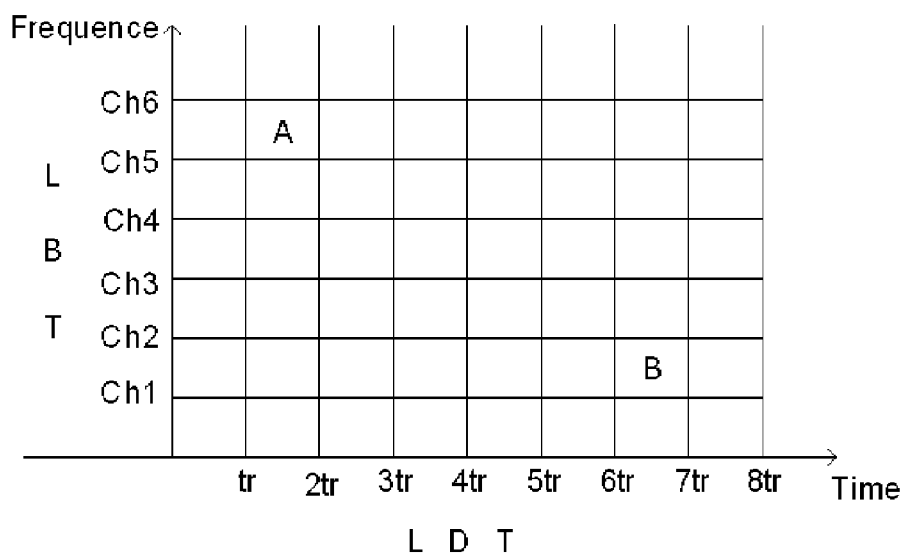
[Fig. 7]

METHOD OF PREVENTING COLLISIONS BETWEEN RFID READERS IN RFID SYSTEM

CROSS-REFERENCE TO RELATED APPLICATION

This application is a National Stage entry of International Application No. PCT/KR2007/000093, filed Jan. 7, 2007, the entire specification claims and drawings of which are incorporated herewith by reference.

1. Technical Field

The present invention relates generally to Radio Frequency Identification (RFID)-related technology and, more particularly, to a method of preventing collisions between RFID readers in an RFID system.

2. Background Art

In general, RFID technology is one of a number of contactless technologies that identify objects using RF signals, and is a core infrastructure technology for ubiquitous networking which can be widely used throughout various fields of society ranging from the manufacture of products through the distribution of products, logistics and financial services.

Such RFID technology is composed of a hierarchical structure, including a device layer, a sensor network layer, a software platform layer, and an application layer. The device layer includes transponders, which are referred to as "tags" and store unique information, and readers, which wirelessly read and interpret information.

One of the RFID technology-related problems is a reduction in the efficiency of tag identification, attributable to collisions between tags. In order to overcome this problem, many techniques for improving the identification rate by increasing the speed of data transmission through the extension of an available frequency range or minimizing collisions between data have been proposed.

Meanwhile, typical readers ensure idle channels (silence channels) using the Listen Before Talk (LBT) algorithm in order to transmit signals, thereby ensuring the stability of communication.

However, the LBT algorithm is problematic in that there is no method of recognizing interference attributable to external signals that may occur at the time of transmitting actual signals. That is, in the case where channels that are acquired by two RFID readers, that is, reader A and reader B, using the LBT algorithm accidentally coincide with each other, the two readers may transmit signals to a tag almost at the same time, in which case the tag cannot correctly receive the signals. As a result, the tag enters a state in which it cannot make any response, therefore a problem occurs in that the readers determine that there is no tag because there is no response, even though the tag actually exists.

DISCLOSURE OF INVENTION

Technical Problem

Accordingly, the present invention has been made keeping in mind the above problems occurring in the prior art, and an object of the present invention is to provide a method of preventing collisions between RFID readers in an RFID system, which determines repeat transmission attempt time periods using random numbers in order to ensure different repeat transmission attempt time periods in the case where a collision between RFID readers has occurred, thereby avoiding a re-collision between the RFID readers.

That is, the LBT algorithm emphasizes the assurance of stable channels in a frequency domain, whereas the present invention controls retransmission time periods using random numbers in order to ensure repeat attempt time points when a collision between readers has occurred, which is referred to as Listen During Talk (LDT).

Technical Solution

In order to accomplish the above object, the present invention provides a method of preventing collisions between readers in an RFID system, including a first step of RFID readers selecting transmitting channels by examining channels; a second step of transmitting signals via the selected transmitting channels; a third step of receiving signals via channels having the same frequencies as the selected transmitting channels; a fourth step of determining whether a collision has occurred by examining the status of the signals that are received via the transmitting channels; a fifth step of, if, as a result of the determination at the fourth step, it is determined that a collision between the readers has occurred, repeating the first to fourth steps after delays of random time periods based on a predetermined equation; and a sixth step of, if, as a result of the fourth step, no collision between readers is detected, communicating with the corresponding RFID tags.

The fourth step may be performed by determining that a collision between the readers has occurred if the status of the signals is noise status. Alternatively, the second step may be performed by transmitting data, the third step may be performed by receiving data, and the fourth step may be performed by comparing the transmitted data with the received data, and determining that a collision has occurred if the transmitted data does not coincide with the received data.

The random time periods of the fifth step may be determined by the following equation:

$$T = n \times t_{response}$$

where n is a random number and $t_{response}$ is a tag response time.

ADVANTAGEOUS EFFECTS

According to the present invention, in the case where a collision between readers has occurred, repeat transmission attempts are made after delays of random time periods, therefore the collision between readers can be avoided, with the result that a problem in which an RFID tag is not identified, even though the RFID tag exists, is overcome. In particular, recently, RFID readers have been constructed in a mobile form, therefore collisions between readers may frequently occur. In this environment, the present invention overcomes the problem of collisions between readers and thus can improve the identification capability of mobile-type RFID readers.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic diagram showing the overall construction of an RFID system that is suitable for the application of the present invention;

FIG. 2 is a block diagram of the RFID reader of FIG. 1;

FIG. 3 is a block diagram of the RFID tag of FIG. 1;

FIG. 4 is a flowchart showing a procedure for preventing collisions between readers in an RFID system according to the present invention;

FIG. 5 is a flowchart showing a procedure for preventing collisions between RFID readers in an RFID system according to another embodiment of the present invention;

FIG. 6 is a timing diagram illustrating the procedure for preventing a collision between RFID readers in an RFID system according to the present invention; and FIG. 7 is a graph illustrating an example in which a collision between RFID readers has been avoided.

BEST MODE FOR CARRYING OUT THE INVENTION

Reference now should be made to the drawings, in which the same reference numerals are used throughout the different drawings to designate the same or similar components.

With reference to the accompanying drawings, preferred embodiments of the present invention are described in detail below.

FIG. 1 is a schematic diagram showing the entire construction of an RFID system that is suitable for the application of the present invention. Referring to FIG. 1, the RFID system includes a plurality of RFID tags 110 for storing unique information, a plurality of RFID readers 120-1 and 120-2 for exchanging wireless signals with the RFID tags 110, reading and interpreting information stored in the RFID tags, and transmitting the information to a server side through a network 130, and a server system 140 for receiving data from the RFID readers 120-1 and 120-2 through the network 130 and providing various services. The server system 140 includes middleware 142 and an application layer 144.

The RFID tags 110 communicate with the RFID readers 120-1 and 120-2 so as to transmit the ID codes and information of objects, to which the tag 110 are attached, to the readers 120-1 and 120-2, and are classified into a passive type and an active type. The RFID readers 120-1 and 120-2 read tag IDs and related information from the RFID tags 110 and provide the information to the middleware 142 under the control of the middleware 142 while communicating with the middleware 142, either via the network 130 or directly. The middleware 142 functions to collect, control and manage ID codes and data that are continuously generated by the RFID readers 120-1 and 120-2. The middleware 142 is connected to all of the elements and thus constructs a middleware network that is organized in a hierarchical manner and has a distributed structure, and provides various services while communicating with the upper application 144. The middleware 142 must ensure the interoperability of various types of reader interfaces, various types of code and network interworking, and various application platforms.

FIG. 2 is a diagram showing an example of the construction of the RFID reader of FIG. 1, and FIG. 3 is a diagram showing an example of the construction of the RFID tag of FIG. 1.

Such RFID tags 110 are classified into two types according to the power supply method: passive-type RFID tags that have no batteries and short recognition distances and active-type RFID tags that are equipped with batteries and relatively long recognition distances. Generally, a frequency band of 433 MHz is used for active-type RFID tags, and a frequency band of 900 MHz is used for passive-type RFID tags. Passive RFID tags, as shown in FIG. 3, each include an antenna 111, a rectifier 112 and a tag chip 113, and have various shapes and sizes. The tag chip 113 is provided with memory therein and stores an identification code, and the rectifier 112 provides power necessary for the tag chip 113 using energy that is transmitted from the reader through the antenna 111.

The RFID reader 120, as shown in FIG. 2, includes an input unit 121 for performing manipulation, a CPU 122, an RF unit 123, an antenna 124, a network connection unit 125, an SRAM 126, a flash memory 127, and a display unit 128.

The input unit 121 includes keys that are used by a user to perform manipulation, the flash memory 127 stores software and data that are used to operate the reader, and the display unit 128 includes LEDs or an LCD, and displays operational status.

The RF unit 123 is divided into a transmission unit and a reception unit. The RF unit 123, under the control of the CPU 122, modulates transmission data to high-frequency wireless signals and transmits the transmission data through the antenna 124, and decodes signals received through the antenna 124 and provides the received data to the CPU 122. With respect to the antenna 124, a single antenna may be used for both transmission and reception, or a transmitting antenna and a receiving antenna may be respectively used for transmission and reception.

The network connection unit 125 is a part for connecting a reader to a middleware side. The network connection unit 125 is implemented using a series interface, such as RS-232C, or Ethernet in the case of a wired network connection, and is implemented using a wireless LAN chip, a CDMA chip or a wireless modem in the case of a wireless network connection.

The CPU 122 loads the software, stored in the flash memory 127, on the SRAM 126 and controls the overall operation of the reader based on the software. That is, the CPU 122 communicates with the middleware 142 through the network connection unit 125, transmits data to the RFID tag 110 through the RF unit 123, and decodes data received from the RFID tag 110 and transmits the decoded data to the middleware 142. Furthermore, the CPU 122 performs an anti-collision algorithm for the recognition of multiple tags, an encryption algorithm for security and the protection of private information, an error correction algorithm, a communication protocol, and a procedure for preventing collisions between readers according to the present invention.

The method of preventing collisions between readers in the RFID system, constructed as described above, according to the present invention is described below.

FIG. 4 is a flowchart showing the procedure of preventing collisions between readers in an RFID system according to the present invention.

A typical full duplex air-communication system receives air signals through a receiving antenna at the time of transmission. The key concept of LDT according to the present invention is to receive signals via a channel corresponding to a frequency identical to that of a transmitting channel at the time of transmission based on the above-described mechanism, and determines whether a collision between readers has occurred in the corresponding channel by examining reception status. In this case, although whether a collision between readers has occurred may be determined using various methods, it is determined using noise in the embodiment of the present invention, shown in FIG. 4, and it is determined by comparing transmission data with reception data in another embodiment, shown in FIG. 5.

Referring to FIG. 4, the RFID readers 120-1 and 120-2 select transmitting channels so as to identify RFID tags 110 at step S11. That is, a plurality of communication channels each having a previously assigned frequency band is defined between the RFID tag 110 and the RFID readers 120-1 and 120-2. When transmission is required because there is a command from the middleware 142 or because an event occurs, unoccupied channels (idle channel) are selected from among the plurality of assigned channels. The LBT algorithm may be used as an algorithm for selecting such idle channels.

Thereafter, the RFID readers 120-1 and 120-2 transmit radio signals via the selected channels and receive radio signals via receiving channels having the same frequencies as the transmitting channels, and determine whether a collision has occurred by examining the status of the corresponding receiving channels at steps S12 and S13. That is, the RFID readers 120-1 and 120-2 propagate radio signals from the RF unit thereof to the air through the transmitting antennas, receive signals through the receiving antennas and the RF units via channels having the same frequencies, and determine that a collision has occurred if there is only noise.

If, as a result of the determination, it is determined that a collision between the readers has occurred, repeat attempts are conducted by repeating the above-described procedure after random time periods, calculated using the following Equation 1, have elapsed, and communication with the corresponding RFID tag 110 is made at steps S14 and S15.

That is, if signals transmitted via the channels selected based on LBT are determined to be noise on the basis of LDT according to the present invention, it is determined that another reader exists within an adjacent area. In this case, the reader A 120-1 and another reader B 120-2 must make repeat attempts for the failed transmission. However, if the two readers 120-1 and 120-2 make repeat attempts at the same time, such attempts must be endlessly repeated. In order to prevent such a collision, the respective readers 120-1 and 120-2 determine transmission repeat attempt time points by generating random numbers according to the present invention. The generated random numbers are used to determine transmission repeat attempt time points based on the following Equation 1.

$$T = n \times t_{response} \qquad \text{MathFigure 1}$$

where 'T' is the time by which a delay must be made by each reader, 'n' is a random number, and $t_{response}$ is the time that is typically taken by a tag to make a response response.

Through the above-described procedure of the present invention, space for the communication of respective readers can be reliably ensured in a frequency domain and a time domain.

FIG. 5 is a flowchart showing a procedure of preventing collisions between RFID readers in an RFID system according to another embodiment of the present invention.

Referring to FIG. 5, RFID readers 120-1 and 120-2 select transmitting channels to identify an RFID tag 110 at step S21. That is, a plurality of communication channels, each having a previously assigned frequency band, is defined between the RFID tag 110 and the RFID readers 120-1 and 120-2. When transmission is required because there is a command from the middleware 142 or because an event occurs, unoccupied channels (idle channels) are selected from among the plurality of assigned channels. The LBT algorithm may be used as an algorithm for selecting such idle channels.

Thereafter, the RFID readers 120-1 and 120-2 modulate predefined transmission data to radio signals in the RF units 123 and transmit the radio signals via the selected channels, and receive radio signals via receiving channels having the same frequencies as the transmitting channels, demodulate the received radio signals and extract received data therefrom at steps S22~S24.

If transmission data is found not to coincide with reception data as a result of the comparison thereof, it is determined that a collision between RFID readers has occurred in a corresponding channel, and then repeated attempts at transmission are conducted after random delay periods, calculated using the above-described Equation 1, have elapsed; if they coincide with each other, it is determined that no collision has occurred and the readers communicate with corresponding RFID tags 110 at steps S25~S28.

As described above, in another embodiment of the present invention, the readers 120-1 and 120-2 determine whether received information coincides with transmitted information through the comparison thereof at the time of transmission, and thereby can reliably ensure space for the respective readers 120-1 and 120-2 in a frequency domain and a time domain.

FIG. 6 is a timing diagram illustrating the procedure of preventing a collision between RFID readers in an RFID system according to the present invention, and FIG. 7 is a graph illustrating the use of channels without collisions according to the present invention.

As shown in FIG. 1, if the same channel is used at the same time according to LBT in the case where the reader A 120-1 and the reader B 120-2 are adjacent to each other, the RFID tag 110, which is located in an area where the cell Cell1 of the reader A 120-1 overlaps the cell Cell2 of the reader B 120-2, receives noise due to a collision between the readers. Accordingly, the RFID tag 110, which has received only noise, cannot make any response, therefore the corresponding reader determines that the tag does not exist because the tag is in a state of not making a response, even though the tag actually exists.

Referring to FIG. 6, in the present invention, in the case where the reader A 120-1 and the reader B 120-2 collide with each other, the reader A 120-1 attempts retransmission after a delay corresponding to a random time period t1 and the reader B 120-2 attempts retransmission after a delay corresponding to a random time period t2 according to the previously described Equation. Here, $t1 = n1 \times t_{response}$ and $t2 = n2 \times t_{response}$. Since n1 and n2 are random numbers and thus are different from each other, repeat attempts are made at different times, with the result that a collision is avoided.

As described above, as illustrated in FIG. 7, according to the anti-collision algorithm of the present invention, in the subsequent transmission trials, the reader A 120-1 uses channel Ch6 at time 2tr and the reader B 120-2 uses channel Ch2 at time 7tr, therefore a collision between the readers can be prevented. In FIG. 7, the vertical axis represents channels Ch1~Ch6, which are assigned between the readers and the tag, and the horizontal axis represents repeat attempt times tr~8tr. From the graph, it can be seen that the selection of channels is determined according to LBT and the transmission repeat attempt times are determined according to LDT.

As described above, according to the present invention, in the case where a collision between readers has occurred, repeat transmission attempts are made after delays of random time periods, therefore the collision between readers can be avoided, with the result that a problem in which an RFID tag is not identified, even though the RFID tag exists, is overcome. In particular, recently, RFID readers have been constructed in a mobile form, therefore collisions between readers may frequently occur. In this environment, the present invention overcomes the problem of collisions between readers and thus can improve the identification capability of mobile-type RFID readers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of preventing collisions between a plurality of Radio Frequency Identification (RFID) readers in an RFID system, the method comprising:
- a first step of selecting, by each of the plurality of RFID readers, transmitting channels by examining predetermined channels;
- a second step of transmitting, by the plurality of RFID readers, transmit signals via the selected transmitting channels;
- a third step of receiving, by the plurality of RFID readers, receive signals from one or more RFID tars via receiving channels having same frequencies as the selected transmitting channels;
- a fourth step of determining whether a collision between the plurality of RFID readers has occurred by examining status of the receive signals that are received via the receiving channels having same frequencies as the selected transmitting channels;
- a fifth step of, if, as a result of the determination at the fourth step, it is determined that the collision between the plurality of RFID readers has occurred, generating random time periods based on a predetermined equation for the plurality of RFID readers respectively, and repeating, by the plurality of RFID readers respectively, the first to the fourth steps after delays of the random time periods for each the plurality of RFID reader, in order to prevent the plurality of RFID readers transmitting signals at the same time and
- a sixth step of, if, as a result of the fourth step, the collision between the plurality of RFID readers is not determined, communicating with the corresponding one or more RFID tags;
- wherein, the first step is performed using a LBT (Listen Before Talk) algorithm to select the transmitting channels;
- wherein the random time periods of the fifth step are determined by the following equation:

$$T = n \times t_{response}$$

where n is a random number and $t_{response}$ is a tag response time.

2. The method as set forth in claim 1, wherein the fourth step is performed by determining that the collision between the plurality of RFID readers has occurred if the status of the receive signals is noise status.

3. The method as set forth in claim 1, wherein the second step is performed by transmitting data, the third step is performed by receiving data, and the fourth step is performed by comparing the transmitted data with the received data, and determining that the collision has occurred if the transmitted data does not coincide with the received data.

* * * * *